United States Patent [19]

Ohshima

[11] Patent Number: 4,520,411
[45] Date of Patent: May 28, 1985

[54] MAGNETIC TAPE RECORDING DEVICE

[75] Inventor: Eiji Ohshima, Tokyo, Japan

[73] Assignee: Sony Corporation, Tokyo, Japan

[21] Appl. No.: 611,727

[22] Filed: May 18, 1984

[30] Foreign Application Priority Data

May 25, 1983 [JP] Japan ................................. 58-92037

[51] Int. Cl.³ ...................... G11B 15/66; G11B 15/60
[52] U.S. Cl. ........................................ 360/85; 360/95; 360/130.23
[58] Field of Search ..................... 360/85, 128, 130.23, 360/130.2, 86, 95; 226/91, 196, 198, 199; 242/55.19 A, 198, 199, 200

[56] References Cited

U.S. PATENT DOCUMENTS

| 3,984,870 | 10/1976 | Inoue | 226/91 |
| 4,017,897 | 4/1977 | Blanding | 226/199 |
| 4,121,267 | 10/1978 | Hayashi | 360/85 |
| 4,122,506 | 10/1978 | Kubo | 360/95 |
| 4,369,473 | 1/1983 | Eibensteiner | 360/85 |
| 4,381,530 | 4/1983 | Owada | 360/130.23 |
| 4,413,293 | 11/1983 | Hathaway | 360/128 |

Primary Examiner—Robert M. Kilgore
Attorney, Agent, or Firm—Lewis H. Eslinger; Alvin Sinderbrand

[57] ABSTRACT

A magnetic tape loading device comprises a head drum having magnetic heads, a drum base supporting the head drum, two loading rings supported on an upper surface of a chassis and rotatable in opposite directions, two tape guide blocks having guide posts for pulling out a magnetic tape from a tape cassette and winding it on the head drum, and guide block guide members for guiding the block. The loading rings are vertically spaced in coaxial relation at the outside of the drum base. The tape guide block is supported on the guide block guide members to be movable along a path slanted with respect to the two loading rings and is coupled to the lower loading ring by a connector mechanism, and the tape guide block is coupled to the upper loading ring, so that the two tape guide blocks are movable in opposite directions around a periphery of the head drum in response to rotation of the two loading rings for winding the tape helically on the periphery of the head drum over an angle of contact with the head drum of at least 300° and with a spacing between the beginning and end of a portion of the tape that contacts the head drum corresponding substantially to the width of the tape.

5 Claims, 13 Drawing Figures

MAGNETIC TAPE RECORDING DEVICE

BACKGROUND OF THE INVENTION

1. Field of the Invention

This invention relates to magnetic tape loading devices.

2. Description of the Prior Art

Video tape recorders (hereinafter referred to as "VTRs") have come into widespread use in recent years. As VTRs become more and more popular they find many applications and there are growing demands for smaller and lighter VTRs since users want VTRs that are more convenient to use and more immediately available for use. To meet such demands, attempts have been made to make VTRs smaller in size. Of the various components of the VTR, a head drum is one of the most important, being one of the largest and heaviest parts. Therefore, one way to produce a smaller VTR is to reduce the diameter of the head drum.

In conventional VTRs, a magnetic tape is wound on an arcuate surface of a head drum over a central angle of contact of about 180°. A video signal indicative of one field is recorded over a predetermined length on each track, this length depending solely upon the head drum diameter and the angle of contact of the magnetic tape with the head drum. Accordingly, to make the head drum diameter smaller without any accompanying reduction of the length on the track, it is necessary that the angle of contact of the magnetic tape be substantially more than 180°. A portable VTR of this kind, combined with a camera, has been disclosed by the assignees of the present application, for example in Published UK Patent Application No. GB 2,112,997 A and in Published EPC Application No. EP 0 102 811 A2, the disclosure of which are hereby incorporated herein by reference.

If the magnetic tape is to be wound on the head drum over the angle of contact of more than 180°, a problem is experienced with a support means of the head drum and also with a loading mechanism for pulling out the magnetic tape from a tape cassette and winding the tape on the periphery of the head drum. More specifically, the loading mechanism has a tape guide portion for guiding the magnetic tape to wind it on the head drum, this tape guide portion being coupled with a drive mechanism through an elongate guide hole or slot formed (e.g. bored) in a chassis on which the head drum is supported. To allow the magnetic tape to be wound on the head drum at an angle of contact of more than 180°, such as more than 300°, the guide hole has to extend substantially fully around the head drum. A guide hole formed (e.g. bored) in this manner separates a portion of the chassis supporting the head drum thereon from the rest, so that the strength of the head drum supporting portion is reduced. Since the head drum is quite heavy and rotates at high speed, then when the drum supporting portion is separated from the rest of the chassis in this manner by the guide hole the head drum vibrates quite easily even when a small shock is imparted to the VTR, and causes an unfavorable displacement of the magnetic tape on the periphery of the head drum.

As well as the above-described problem of the low strength of the head drum supporting portion, it is difficult in the case of the conventional tape guide mechanism to wind the magnetic tape on the periphery of the head drum over an angle of contact of substantially more than 180°. If this is attempted, the tape guide mechanism is rendered complex and a large space is required to move the tape guide mechanism. Therefore, it is scarcely possible in the case of the conventional tape guide mechanism to comply sufficiently with the demands for making the device smaller.

SUMMARY OF THE INVENTION

A first object of the present invention is to provide a magnetic tape loading device which is small in size, light in weight, capable of supporting a head drum stably and without causing any reduction in the strength of its support member, such as a chassis etc., and is also capable of winding a magnetic tape on a predetermined position on the periphery of the head drum with good accuracy so that the magnetic tape will run stably.

A second object of the present invention is to provide a magnetic tape loading device which is protected against large impact loads and of which a drive motor is protected against impulsive overloading at the instant when loading of the magnetic tape is finished, and further is capable of accurately defining the beginning and end of the portion of the magnetic tape wound on the head drum for increasing the accuracy of travel of the magnetic tape.

A third object of the present invention is to provide a magnetic tape loading device which is capable of winding a magnetic tape on the periphery of the head drum with a predetermined helical pitch and without giving rise to unfavorable torsion or folding of the magnetic tape during the travel of a short length of the magnetic tape pulled out from the tape cassette.

A fourth object of the present invention is to provide a magnetic tape loading device which is so constructed that the magnetic tape travels smoothly through a gradually ascending path from a position where the tape has been pulled out of the tape cassette to the beginning of the portion of the magnetic tape that makes contact with the head drum without causing any torsion, folding or slackening of the magnetic tape, and is simple in construction and easily adjustable.

According to the present invention there is provided a magnetic tape loading device comprising a head drum having magnetic heads, a drum base supporting the head drum, two loading rings supported on an upper surface of a chassis and rotatable in opposite directions, two tape guide blocks having guide posts for pulling out a magnetic tape from a tape cassette and winding it on the head drum, and guide members for guiding one of the two tape guide blocks, the two loading rings being vertically spaced in coaxial relation at the outside of the drum base, said one of the two tape guide blocks being supported on the guide block guide members to be movable along a path slanted with respect to the two loading rings and being coupled to the lower loading ring by a connector mechanism, and the other of the tape guide blocks being coupled to the upper loading ring, so that the two tape guide blocks are movable in opposite directions around a periphery of the head drum in response to rotation of the two loading rings for winding the magnetic tape helically on the periphery of the head drum over an angle of contact with the head drum of at least 300° and with a spacing between the beginning and end of a portion of the magnetic tape that contacts the head drum corresponding substantially to the width of the magnetic tape.

Since the magnetic tape is wound helically on the periphery of the head drum over an angle of contact of at least 300° and in such a state that the spacing between the beginning and end of the portion of the magnetic tape that contacts the head drum corresponds substantially to the width of the magnetic tape, the diameter of the head drum can be made much smaller than that of the conventional head drum, and the size and weight of the device can thus greatly be reduced.

In addition, since the tape guide blocks for pulling out the magnetic tape from the tape cassette and winding it on the periphery of the head drum, and also the loading rings for moving the tape guide blocks around the periphery of the head drum, are mounted on the upper surface of the chassis, it is unnecesasry to make a slot in the chassis for moving the tape guide blocks. Provided the portion of the chassis supporting the head drum is not separated from the rest, the head drum is stably supported with sufficient strength by the chassis. Furthermore, absence of the slot enables the chassis to be constructed to be of low thickness and light in weight, which can contribute to a reduction in weight of the device. The head drum can thus be free from vibrations and the magnetic tape can be wound with good accuracy on and travel stably along a predetermined portion of the periphery of the head drum.

The magnetic tape loading device preferably comprises a spring by which a torque from the loading ring is transmitted to the tape guide block, so that when the tape guide block is stopped in a position where an operation of loading the magnetic tape on the head drum is finished, the loading ring is stopped against the force of the spring.

If the two tape guide blocks are, in this way, stopped against the forces of the springs at positions where their contributions to the loading operation are to be finished, for absorbing impact loads which are generated at the instant when the tape guide blocks are stopped, the magnetic tape loading device is protected against large impact loads and, also, its drive motor is protected against impulsive overloading. And, as the two tape guide blocks are stably positioned by the forces of the springs, the beginning and end of the portion of the magnetic tape contacting the head drum are accurately defined to stabilize the travel of the magnetic tape.

The magnetic tape loading device is preferably so constructed that said one of the two tape guide blocks movable along the guide block guide members has a tape guide on a front end thereof for gradually moving the magnetic tape a distance corresponding substantially to the width of the magnetic tape during the operation of loading the magnetic tape on the head drum.

That is, as the magnetic tape is gradually moved by the width of the magnetic tape by the tape guide disposed at the front end of said one of the two tape guide blocks, while guided by the block guide members to be moved along the slanting path toward the loading rings, the magnetic tape is wound smoothly on the periphery of the head drum with a helical pitch corresponding to the width of the magnetic tape without giving use to unfavorable torsion, folding, etc. of the magnetic tape during travel of a short pulled-out length of the magnetic tape from the tape cassette.

The magnetic tape loading device is preferably so constructed that a plurality of guide posts are arranged in a path of travel of the magnetic tape from a position where the tape has been pulled out from the tape cassette to the position of the beginning of the portion of the tape that contacts the head drum, said two positions being of different height from one another, only two of the plurality of guide posts are slanted, one of the slanted guide posts being mounted on said one of the two tape guide blocks and the other being fixed to the chassis, and the magnetic tape is supported only by the two slanted posts over an extent thereof over which said difference in height as between said two positions takes place.

Since the magnetic tape, over the extent thereof over which the distance in height as between the above-mentioned two positions takes place, is supported only by two slanted guide posts, one mounted on the tape guide block and the other fixed to the chassis, the magnetic tape is protected against torsion, folding or slackening, in contrast to what would be the case if many slanted guide posts were used. If many slanted guide posts, e.g. three to five guide posts, were disposed in the above path of travel, the tape supporting system would be rendered complex. Also, the design or adjustment of the angles of inclination would be difficult, because the direction of travel of the magnetic tape is determined by the angle of inclination of each slanted guide posts. For example, if the angle of inclination of an intermediate one of three slanted guide posts were not adjusted properly, the magnetic tape would not be supported throughly by the intermediate slanted guide post over all of its width. In such a condition, the magnetic tape could not be in contact with the intermediate slanted guide post at a predetermined position thereon, so that the magnetic tape could come out of contact with the intermediate slanted guide post, or would not be protected against torsion or folding.

As indicated above, the fact that the magnetic tape preferably is supported, over the extent over which takes place the difference in height as between the position where the tape has been pulled out from the tape cassette and the position of the beginning of the portion where the magnetic tape contacts the head drum, by the two slanted guide posts only, tends to prevent the magnetic tape from being subjected to torsion, folding or slackening. Further, since the slanted guide posts are only two in number, their construction is relatively simple, and they can be adjusted with ease.

The above, and other objects, features and advantages of this invention will be apparent from the following detailed description of illustrative embodiments which is to be read in connection with the accompanying drawings.

DESCRIPTION OF THE PREFERRED EMBODIMENTS

A magnetic tape loading device or mechanism embodying the present invention will now be described with reference to the accompanying drawings. The magnetic tape loading device or mechanism is shown by way of example as being embodied as a tape loading device or mechanism in a video camera combined with a VTR deck, though it should be appreciated that magnetic loading devices or mechanisms embodying the invention can be so implemented as to be usable in other applications.

Figure 1:
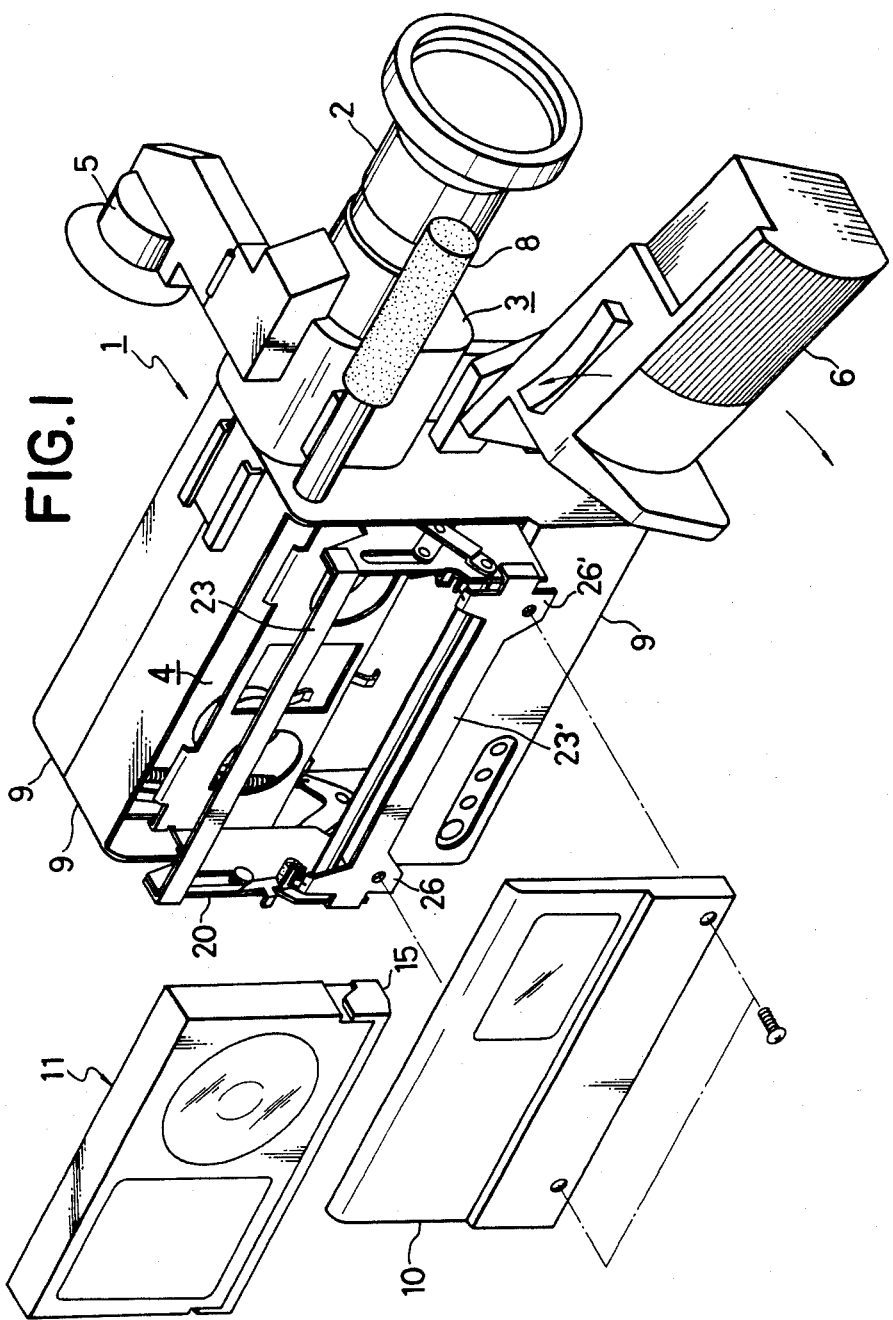
FIG. 1 is a partly exploded perspective view of a video camera and a magnetic tape cassette, the cameral having combined therewith a VTR deck that includes a magnetic tape loading device or mechanism embodying the present invention.
Figure 2:
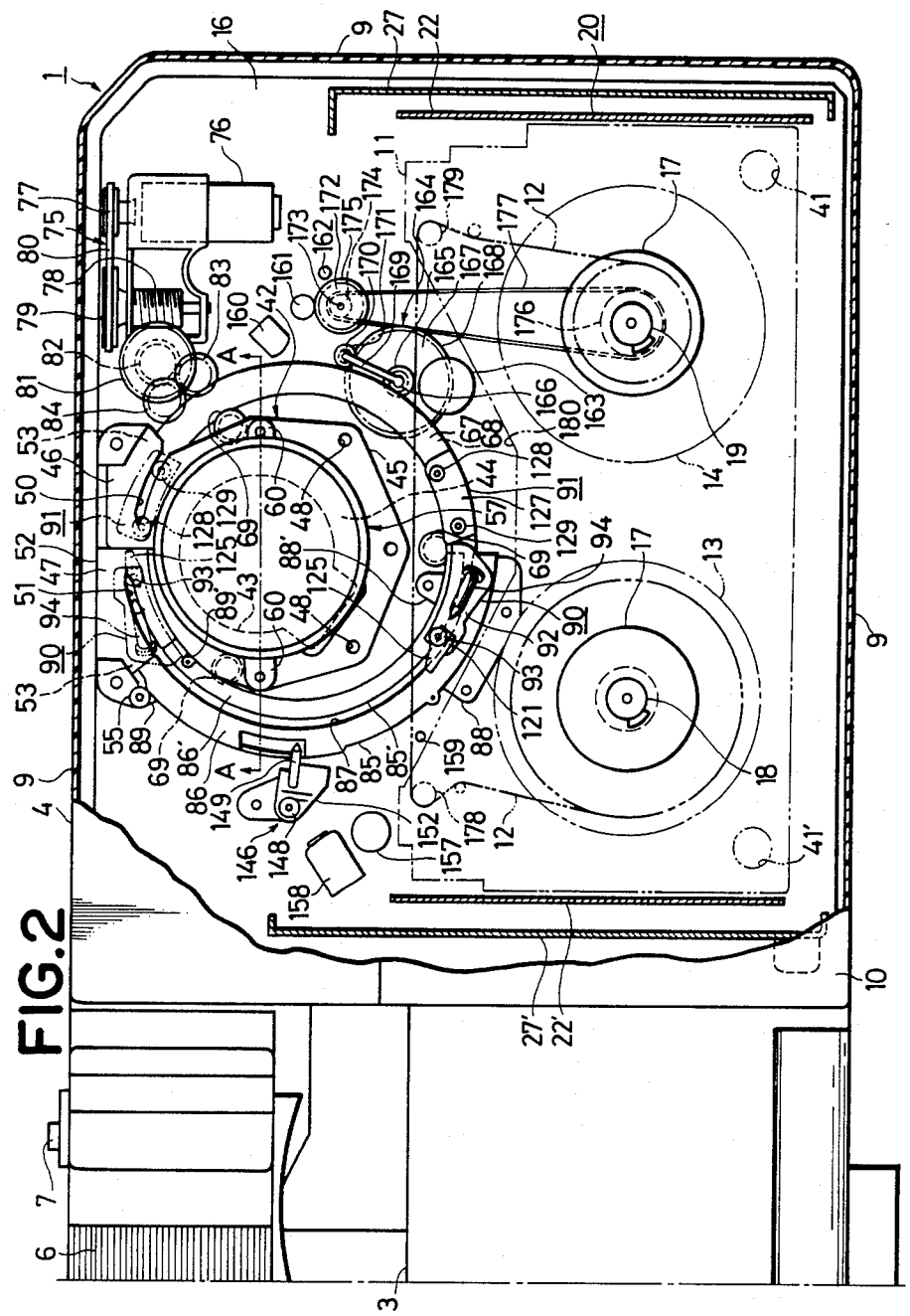
FIG. 2 is a fragmentary plan view of the VTR deck.

Referring to the drawings, and in particular to FIG. 1, a video camera 1 combined with a VTR comprises a picture pickup unit 3 including a lens 2, and a VTR deck 4 disposed behind the picture pickup unit 3. The picture pickup unit 3 has in a rear portion thereof an image pickup tube (not shown) for converting an optical image of an object, which image has passed through the lens 2, into an electrical video signal which is magnetically recorded on a magnetic tape by a magnetic head in the VTR deck 4. A foldable optical viewfinder 5 is so mounted on top of the picture pickup unit 3 as to project laterally to one side of the camera 1. A handle 6, doubling as a battery holder, is pivotally or swingably mounted on a front lower portion of the VTR deck 4. The handle 6 is lockable at predetermined angles and is unlockable for pivotal or swinging movement by depressing an unlocking button 7 (FIG. 2). When the cameral 1 is to be used, the handle 6 is locked substantially in the position shown in FIG. 1 and gripped by hand while the VTR deck 4 is shouldered for stable operation of the camera 1. When not in use, the handle 6 is turned or pivoted upwardly until its longitudinal axis extends along the front face of the VTR deck 4 so that the camera 1 is folded into a compact form. A microphone 8 picks up voices to magnetically record them on the magnetic tape through a magnetic head in the VTR deck 4. The camera 1 also includes a pair of covers 9 mounted on the VTR deck 4, a cassette holder 20 movable with respect to the VTR deck 4, and a cover 10 attached outside of the cassette holder 20.

A VTR tape cassette 11 has therein a pair of tape reels 13, 14 (FIG. 2) on which a magnetic tape 12 is wound. The tape cassette 11 has a front face from which the magnetic tape can be pulled out, the front face being covered by an operable and closable cover 15.

The components of the VTR deck 4 will now be described with reference to FIGS. 2 to 13, in which description the terms "front", "rear", "right", "left", "upper" and "lower" as used to describe the positioning of components of the device correspond, respectively, for convenience of description, to "upper", "lower", "right", "left", "surface" and "under surface" positioning as shown in FIG. 2.

The VTR deck 4 has a chassis 16 supporting a pair of rotatable reel bases 17 which are locate near a rear edge of the chassis 16 (the lower side of FIG. 2), near left-hand and right-hand edges thereof, and project from an upper surface of the chassis 16. The reel bases 17 have integral shafts 18, 19, respectively, for engagement with the tape reels 13, 14 in the tape cassette 11.

Figure 3:
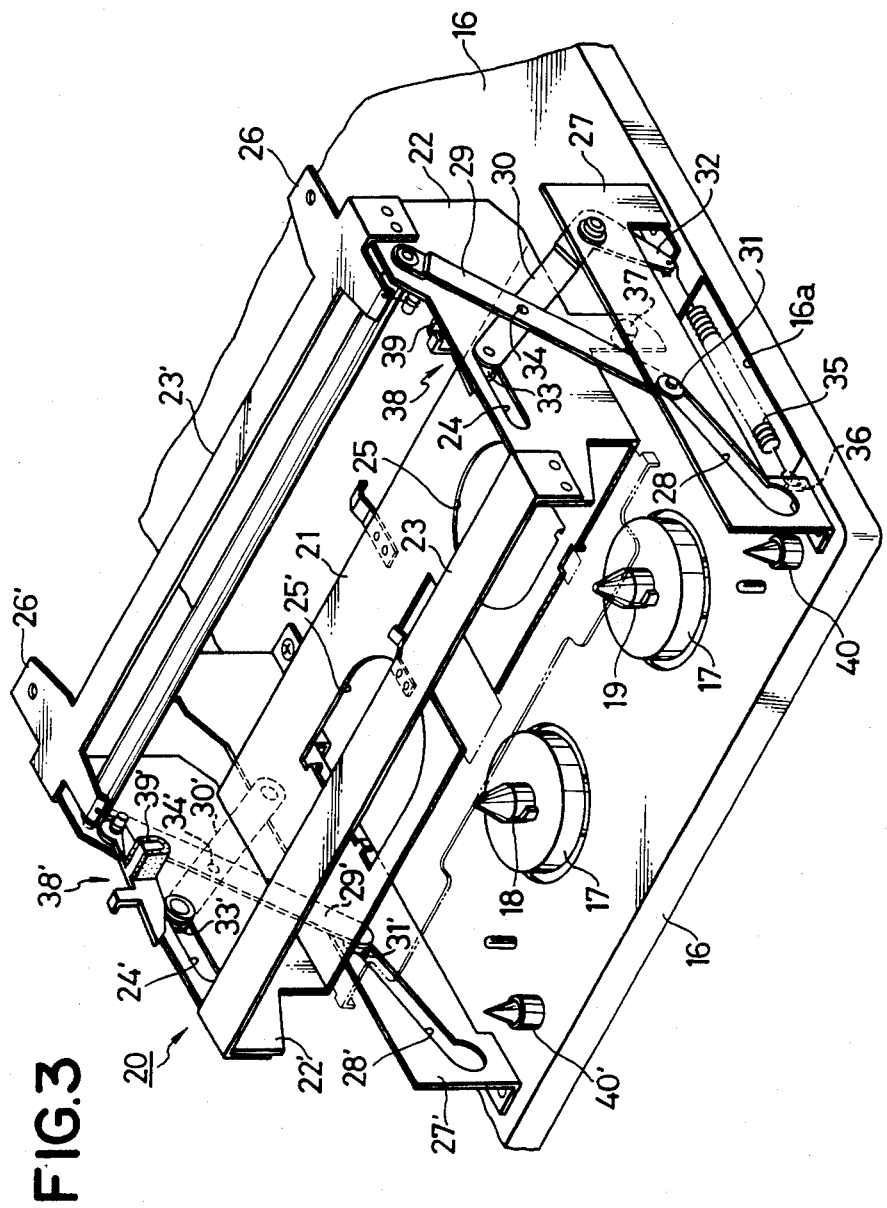
FIG. 3 is a perspective view of a cassette holder mechanism.
Figure 4:
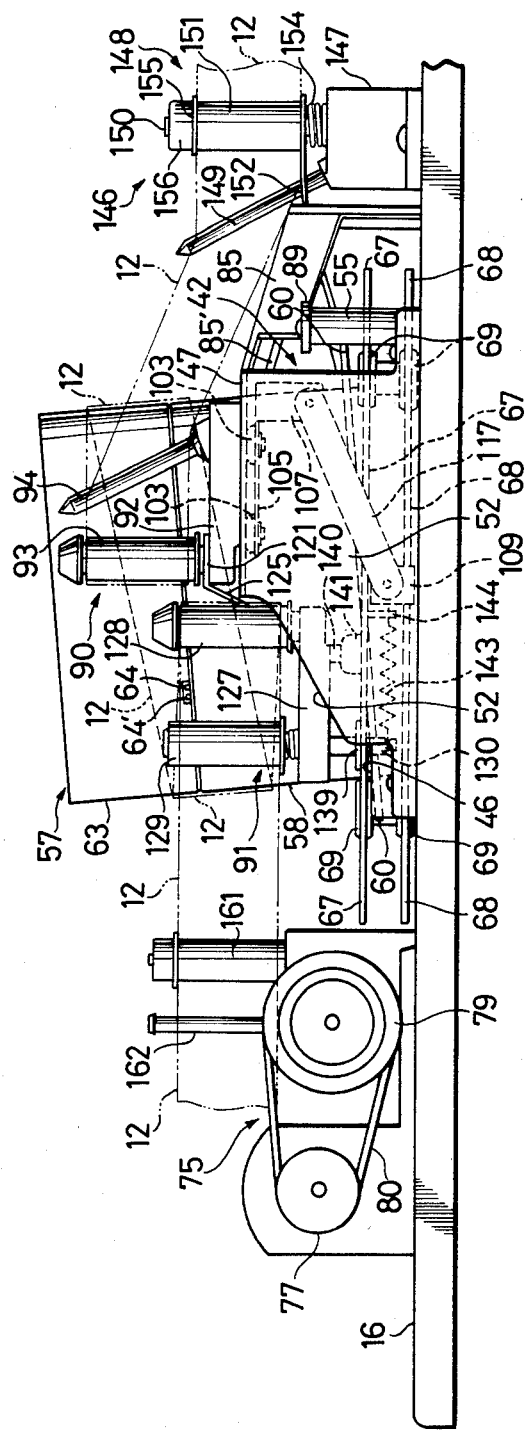
FIG. 4 is a front elevational view of the VTR deck at a time when a magnetic tape has been loaded.

The cassette holder 20 shown in FIG. 3 holds the tape cassette 11 and conveys it to a predetermined position in the VTR deck 4. The cassette holder 20 is movably supported on the rear side of the chassis 16 and is movable between a cassette setting or use position and a cassette loading (unloading) position.

Referring now in particular to FIG. 3, the cassette holder 20 comprises a bottom plate 21, a pair of upstanding side plates 22, 22' which extend from the right-hand and left-hand edges of the bottom plate 21, and a pair of crosspieces 23, 23' which tie together upper edges of the side plates 22, 22'. The side plates 22, 22' have horizontal guide holes or slots 24, 24' respectively, formed in upper positions thereof close to rear edges thereof and extending horizontally. The bottom plate 21 has openings 25, 25' bored or otherwise formed therein in correspondence to the reel bases 17 provided with their respective tape reel engagement shafts 18, 19. Attachment fingers 26, 26' project from right-hand and left-hand ends of the crosspiece 23' toward the front side of the device within the spacing between the side plates 22, 22'. The cover 10 is attached to the attachment fingers 26, 26' by machine screws to serve as an upper surface of the cassette holder 20. Upstanding support walls 27, 27' are mounted near the right-hand and left-hand edges, respectively, of the chassis 16 and have slanting guide holes or slots 28, 28' extending obliquely from rear lower portions up to central portions of the support walls 27, 27'.

The cassette holder 20 is operatively coupled to the support walls 27, 27' by connector arms 29, 30 and 29', 30'. The connector arms 29, 29' each have one end pivotally connected to a front upper portion of the side plate 2, 22', respectively, of the cassette holder 20. The other ends of the connector arms 29, 29' have respective rollers 31, 31' which are slidably fitted in the slanting guide holes 28, 28', respectively, in the support walls 27, 27'. The connector arms 30, 30' each have one end pivotally connected to a front upper portion of the support wall 27, 27', respectively. The other ends of the connector arms 30, 30' have respective rollers 33, 33' which are slidably fitted in the horizontal guide holes 24, 24', respectively, in the side plates 22, 22'. The pairs of connector arms 29, 30 and 29', 30' are each coupled rotatably to each other at central portions thereof by pins 34, 34', respectively, and an actuator arm 32 projects at right angles from the connector arm 30.

A tension spring 35 has one end thereof connected to a projection 36 extending from a rear lower portion of the suport wall 27, and the other end thereof connected to the actuator arm 32 of the connector arm 30. The distal end of the actuator arm 32 is normally biased towards the rear side of the chassis 16 due to the tension of the spring 35. Accordingly, the connector arm 30 is urged to turn about its point of pivotal connection to the support wall 27 to displace the distal end of the connector arm 30 in an upward direction, so that the cassette holder 20 is normally biased to move upwardly. More specifically, the roller 33 attached to the distal end of the connector arm 30 pushes up the upper edge of the horizontal guide hole 24 to urge the cassette holder 20 to be raised normally away from the chassis 16.

A lock pin 37 is mounted on an inner surface of a tongue projecting downwardly from a lower edge of the right-hand side plate 22 of the casette holder 20. When the cassette holder 20 is positioned in the cassette setting position, the lock pin 37 is locked by a lock mechanism (not shown) to lock the cassette holder 20 in the cassette setting position.

When the cassette holder 20 is depressed toward the chassis 16 in response to a push on the cover 10 of the cassette holder 20, the cassette holder 20 is lowered while the connector arms 29 and 30, 29' and 30' are rotated into collapsed positions until the cassette holder 20 is positioned, within the spacing between the support walls 27, 27', on the chassis 16. At the same time, the lock pin 37 is lowered through an opening 16a formed in a right-hand edge portion of the chassis 16 and engaged by the nonillustrated lock mechanism, whereupon the cassette holder 20 is locked in a predetermined position. When the lock pin 37 is thereafter unlocked, the cassette holder 20 springs back from the cassette setting position to the cassette unloading (loading) position, as shown in FIG. 3, due to the tension of the spring 35.

Cassette pressers 38, 38' are attached to inner upper portions of the side plates 22, 22', respectively, of the cassette holder 20. The cassette pressers 38, 38' include presser members 39, 39' made of a material having a high coefficient of friction, such as rubber. When the cassette holder 20 is in the cassette unloading position, the presser members 39, 39' are positioned out of the way of insertion of the tape cassette 11 into the cassette holder 20. When the cassette holder 20 is at least in the locked position, the pressure members 39, 39' press or push against opposite side portions of the upper surface of the tape cassette 11 to hold the tape cassette 11 within the cassette holder 20.

The front cover 15 of the tape cassette 11 is pivotally supported so that it can open and close the front face of the cassette case. When the tape cassette 11 is to be inserted into the cassette holder 20, or until the cassette holder 20 is locked at least in the cassette loading position, the front cover 15 is opened by a cover opening member (not shown).

Upstanding positioning pins 40, 40' are mounted on the upper surface of the chassis 16 near the rear edge thereof for positioning the tape cassette 11. Upper portions of the pins 40, 40' are formed as cones. The case of the tape cassette 11 has conical recesses 41, 41' (FIG. 2) formed in its under surface. The tape cassette 11 can be positioned in a predetermined place on the VTR deck 4 when the conical recesses 41, 41' fit over the conical upper portions of the pins 40, 40', respectively. As the tape cassette 11 is set in the predetermined position on the VTR deck 4 by both the cassette holder 20 and positioning pins 40, 40', the magnetic tape 12 in the tape cassette 11 is pulled out of the case by a tape loading mechanism.

The tape loading device or mechanism and components related thereto will now be described.

Figure 5:
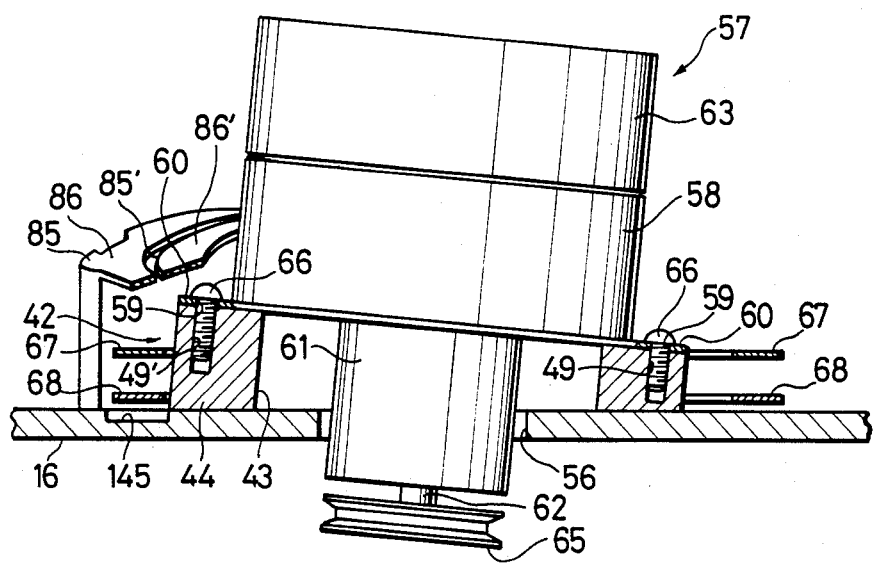
FIG. 5 is a fragmentary cross-sectional view taken along a line A-A in FIG. 2.
Figure 7:
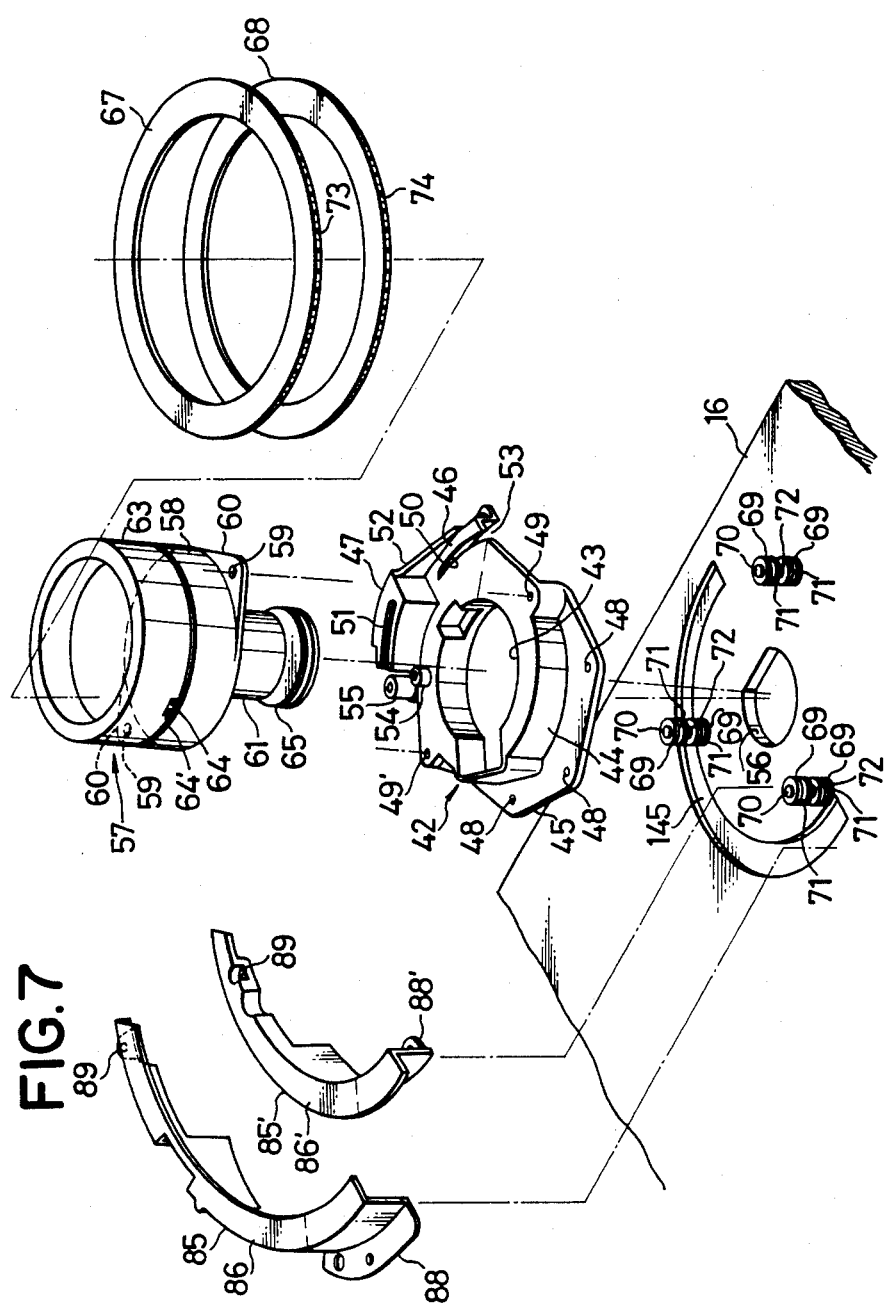
FIG. 7 is an exploded perspective view of the VTR deck.
Figure 8:
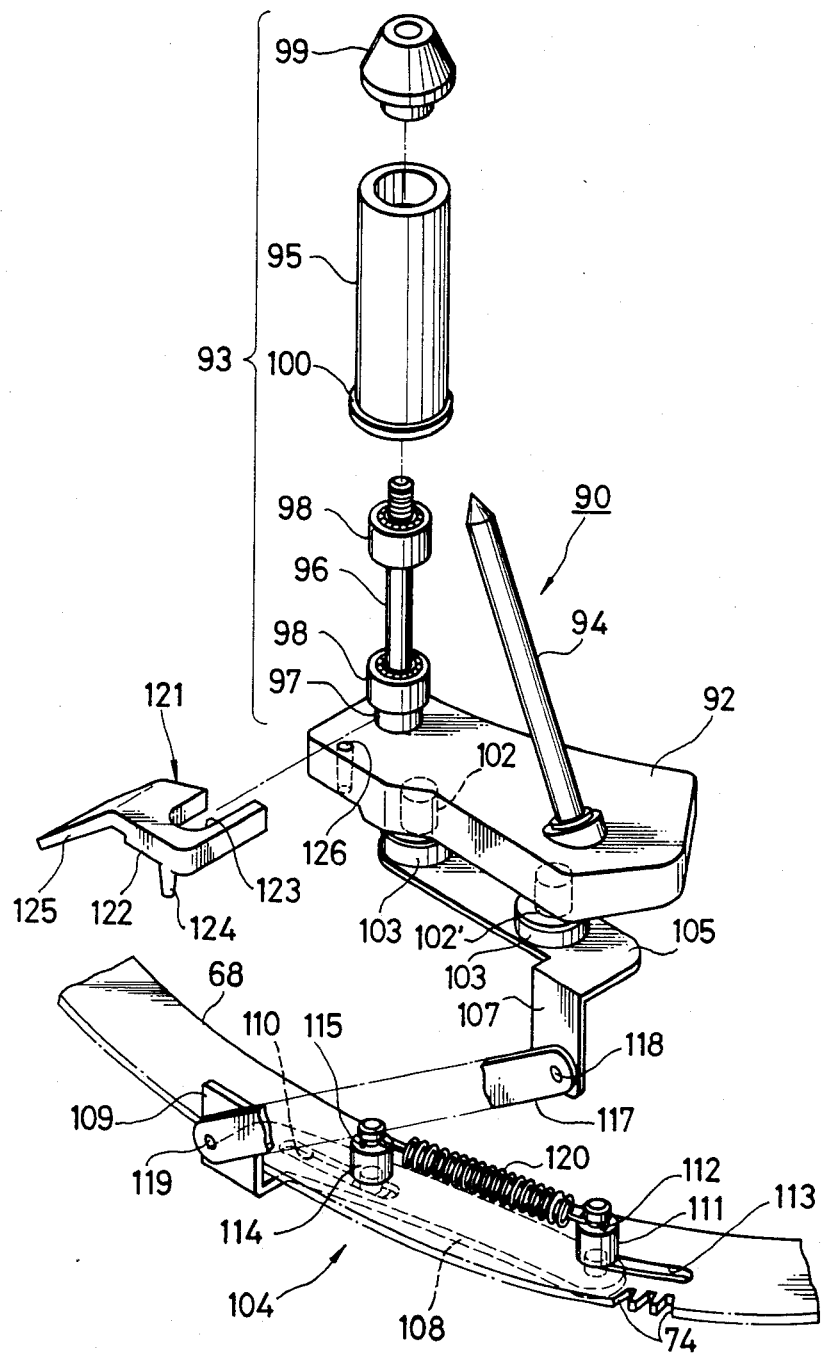
FIG. 8 is an exploded view of a tape guide block of the loading device.
Figure 9:
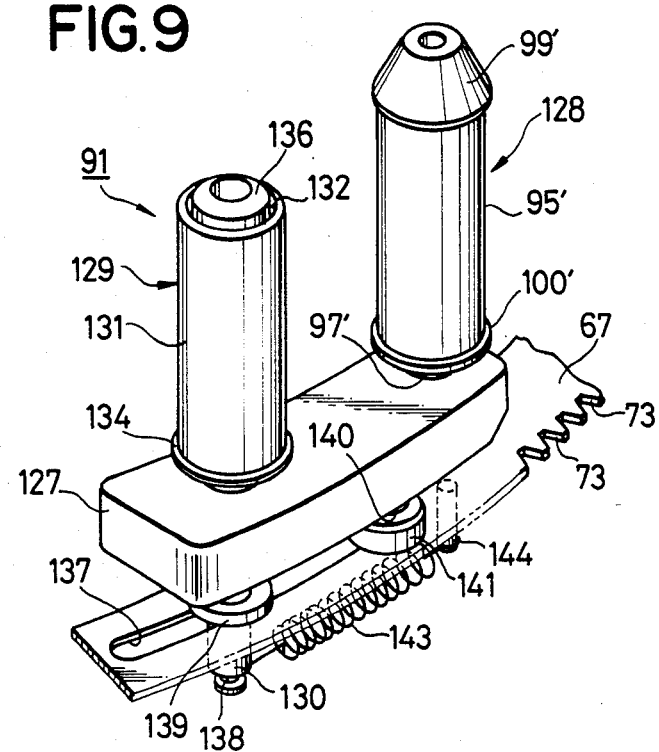
FIG. 9 is a perspective view of another tape guide block of the loading device.
Figure 11:
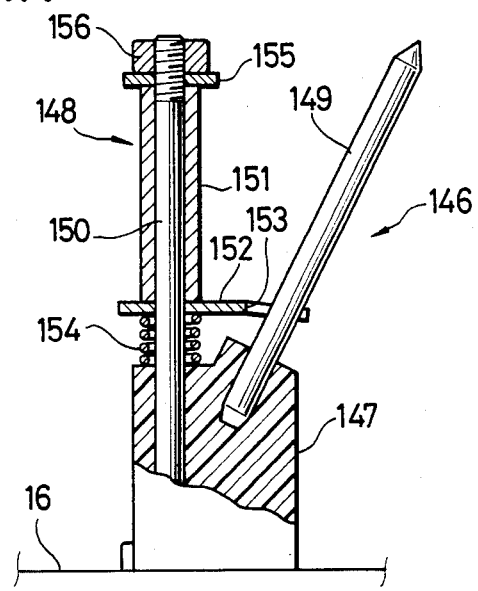
FIG. 11 is a vertical cross-sectional view of a fixed guide block.

As shown in FIG. 7, a drum base 42 comprises a drum attachment base 44 having a central hole 43, a flange 45 of a substantially polygonal shape, as viewed in plan, extending outwardly from a lower end of the drum attachment base 44, and two guide ends 46, 47 on a front portion of the drum base 42. The flange 45 has attachment holes 48 through which screws extend to fix the drum base 42 to an upper surfce of the chassis 16. The drum attachment base 44 has an upper end surface which is slightly inclined, as shown in FIG. 5, so that its right-hand side is lower than its left-hand side with respect to the upper surface of the chassis 16. The upper end surface of the drum attachment base 44 has attachment holes 49, 49' to attach it to a head drum 57 at right-hand and left-hand sides thereof.

The guide ends 46, 47 serve to define final positions of movable tape guide members (described hereinbelow) when loading of the magnetic tape is finished. The guide ends 46, 47 have upper end surfaces having different heights. More specifically, the right-hand guide end 46 extends from the right-hand portion of the front end surface of the drum attachement base 44, this right-hand portion being the smaller in height from the upper surface of the chassis 16. The left-hand guide end 47 comprises a raised portion on the left-hand portion of the front end surface of the drum attachment base 44. The upper surface of the left-hand guide end 47 is substantially higher than that of the right-hand guide end 46. The right-hand guide end 46 has a guide groove 50 defined in its upper surface and having an open right-hand end. The left-hand guide end 47 has a guide groove 51 defined in its upper surface and having an open left-hand end.

The drum base 42 has a front wall 52 at the front ends of the guide ends 46, 47. Below the guide ends 46, 47 there is a space 53 of a substantially channel-shaped cross-section defined by bottom surfaces of the guide ends 46, 47, a rear side surface of the front wall 52, and a front outer peripheral surface of the drum attachment base 44.

The drum attachment base 44 has a projection 54 on the front portion of the upper end surface thereof. A projection 55 is disposed leftwardly of the left-hand guide end 47. The projections 54, 55 have internally threaded holes.

The foregoing portions of the drum base 42 may comprise an integral die casting of an aluminum-based alloy, for example.

The chassis 16 has a through hole 56 formed in a substantially central portion close to its front edge. The drum base 42 is fixed to the upper surface of the chassis 16 with the axis of the central hole 43 in the drum attachment base 44 being substantially aligned with the axis of the through hole 56 in the chassis 16.

The head drum 57 comprises upper and lower drums 63, 58. The lower drum 58 is non-rotatable and has two attachment flanges 60, 60 projecting radially from a lower end of the lower drum 58 and disposed opposite one another, the attachment flanges 60 having respective holes 59 bored or otherwise formed therein. The lower drum 58 has an integral casing 61 on the lower end thereof, which casing houses a drum servo-mechanism and the like. As shown in FIG. 5, a rotatable shaft 62 extends substantially vertically through a central portion of the lower drum 58 and is rotatably supported by the lower drum 58. The upper drum 63 is attached to an upper portion of the rotatable shaft 62. Video heads 64, 64' are disposed with a small interval therebetween at a lower end of the periphery of the upper drum 63 and are rotated together with the upper drum 63. A belt pulley 65 is attached to a lower end of the rotatable shaft 62 whereby the pulley 65 can be connected to a drive unit described hereinbelow by a drive belt 80 entrained around the pulley.

The head drum 57 is fixed to the upper surface of the drum attachment base 44 by machine screws 66 that extend through the holes 59 in the attachment flanges 60 of the lower drum 58 and are threaded into the attachment holes 49, 49' in the drum attachment base 44. The lower portion of the casing 61 of the head drum 57 and the pulley 65 extend through the insertion hole 56 in the chassis 16 and are positioned below the chassis 16. Therefore, the head drum 57 has its axis inclined, in alignment with the axis of the drum base 42, such that the upper end of the head drum 57 is tilted slightly to the right from the direction perpendicular to the upper surface of the chassis 16: see FIG. 5.

Figure 6:
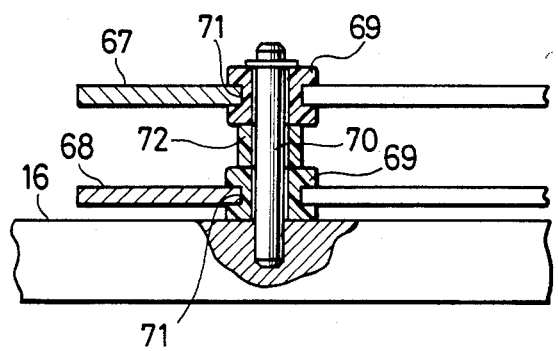
FIG. 6 is a fregmentary vertical cross-sectional view of a portion of the VTR deck in which loading rings of the loading device are rotatably supported.

As shown in FIGS. 5 to 7, annular loading rings 67, 68 are disposed coaxially at a vertical interval or spacing from one another and surround the periphery of the drum attachment base 44 of the drum base 42 at predetermined intervals or spacings. Front portions of the loading rings 67, 68 pass through the space 53 defined in the front portion of the drum base 42. Accordingly, the front portions of the loading rings 67, 68 are positioned beneath the guide ends 46, 47 of the drum base 42, and horizontally positioned with respect to the head drum 57 such that the inner peripheries of the front portions of the loading rings 67, 68 are located close to a front portion of the periphery of the head drum 57. The inner peripheries of the loading rings 67, 68 are supported by rollers 69 (see FIG. 6) arranged at angular intervals of substantially 120° so that the loading rings can rotate with respect to the chassis 16. An upper and a lower roller 69 are rotatably fitted over each of a plurality of vertical pins 70 mounted on the chassis 16. Each roller 69 has a respective engagement groove 71. Spacers 72 are interposed between the upper and lower rollers 69 to keep them spaced apart. The upper loading ring 67 has its inner periphery engaged in the engagement grooves 71 of the upper rollers 69, and the lower loading ring 68 has its inner periphery engaged in the engagement grooves 71 in the lower rollers 69. Thus, the loading rings 67, 68 are rotatably supported on the chassis 16 by the rollers 69. The loading rings 67, 68 have gear teeth 73 and 74, respectively, on their outer peripheries.

The above-mentioned drive unit 75 comprises a motor 76 having a drive shaft to which a pulley 77 is attached. A worm 78 has a shaft with a pulley 79 attached. The above-mentioned drive belt 80 is entrained around the pulley 77 of the motor 76 and the pulley 79 of the worm 78 so that the worm 78 is rotated by the motor 76. A worm wheel 81 has gear teeth held in mesh with the gear teeth of the worm 78. An integral speed reduction gear 82 is provided on the lower side of the worm wheel 81. An upper loading gear driving gear 83 has gear teeth held in mesh with the gear teeth 73 on the outer periphery of the upper loading ring 67 and the gear teeth of the speed reduction gear 82. A lower loading gear driving gear 84 has gear teeth held in mesh with the gear teeth 74 on the outer periphery of the lower loading ring 68 and the gear teeth of the upper loading ring driving gear 83.

The upper loading ring 67 is rotated by the driving gear 83 driven by the motor 76 through the belt 80, the worm 78, the worm wheel 81 and the speed reduction gear 82, and the lower loading gear 68 is rotated by the driving gear 84 rotated by the driving gear 83. As a consequence, the upper and lower loading rings 67, 68 are rotated in opposite directions when the motor 76 is energized.

The motor 76 of the drive unit 75 not only rotates the loading rings 67, 68, but also rotates the rotatable upper drum 63 of the head drum 57, through an appropriate head drum control mechanism (not shown), and rotates the tape reel driving shafts 18, 19 through a magnetic tape drive control mechanism (not shown).

Figure 10:
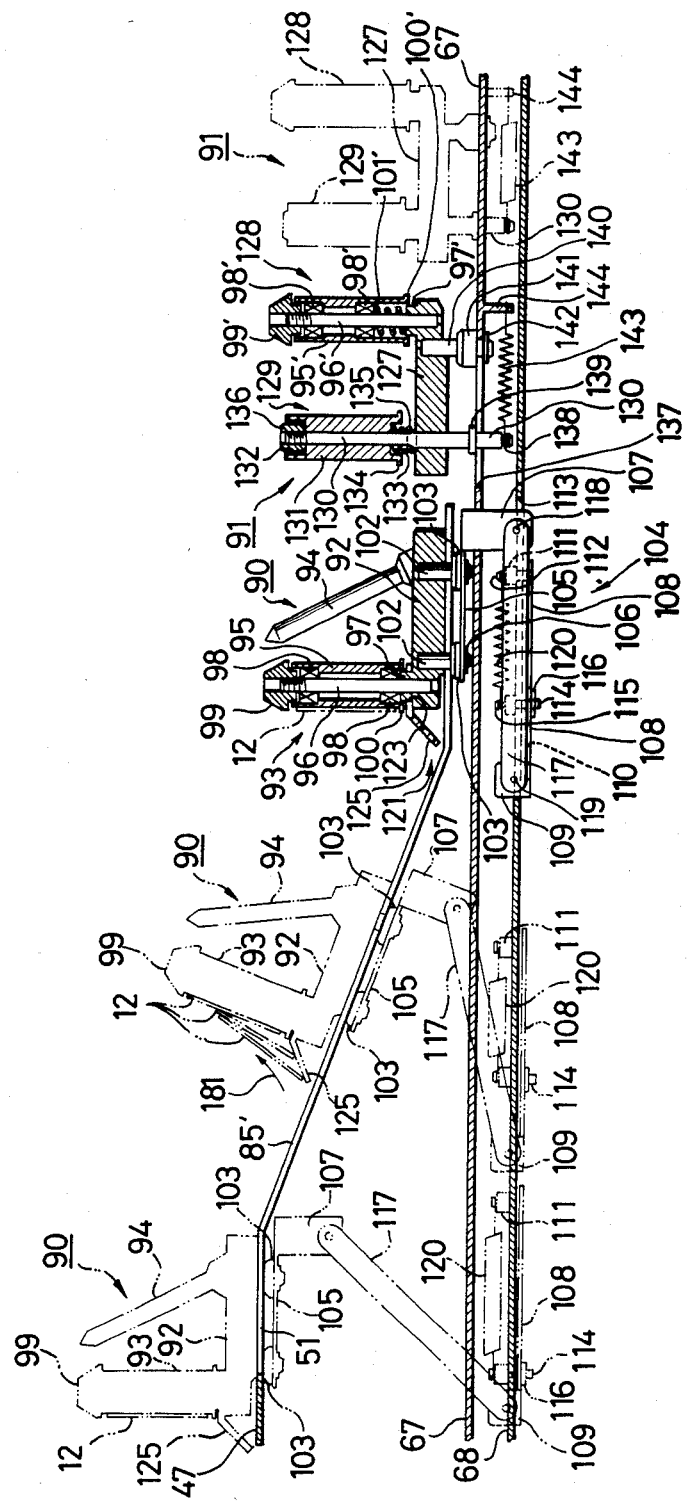
FIG. 10 is a side elevational view, partly in cross-section, showing how the tape guide blocks are moved.

A pair of outer and inner guide block guide members 85, 85' have guide surfaces 86, 86', respectively, which are arcuate in shape as viewed from above. The guide surfaces 86, 86' are slightly spaced from each other to define a guide slot 87 between them. The guide members 85, 85' are attached to the chassis 16 and the drum base 62 such that the guide slot 87 between the guide surfaces 86, 86' is substantially coextensive with the left-hand half of the upper loading ring 67, that is the length of the ring 67 extending clockwise from the rear side thereof and terminating slightly short of the front side thereof. The outer guide member 85 has an attachment flange 88 projecting outwardly from a lower portion of a proximal end thereof and another attachment flange 89 projecting outwardly from a distal end thereof. The inner guide member 85' has an attachment flange 88' projecting inwardly from a lower portion of a proximal end thereof and an attachment flange 89' on a distal end thereof. The outer guide member 85 is fixed in place by screwing the attachment flange 88 to the chassis 16 and the attachment flange 89 to the projection 55 on the drum base 42, and the inner guide member 85' is fixed in place by screwing the attachment flange 88' to the chassis 16 and the attachment flange 89' to the projection 54 on the drum base 42. The guide surfaces 86, 86' of the respective guide members 85, 85' include distal end portions lying parallel to the upper surface of the chassis 16 and surfaces slanted so as to be progressively spaced higher away from the upper surface of the chassis 16 from the proximal end portions to the distal ends of the guide surfaces 86, 86', as shown in FIGS. 5 and 10. The distal ends of the guide surfaces 86, 86' are held in abutment against the left-hand edge of the left-hand guide end 47 of the drum base 42 so that an end of the guide slot 87 is contiguous to the guide groove 51 defined in the left-hand guide end 47 of the drum base 42. The proximal ends of the guide members 85, 85' are positioned slightly higher than the upper surface of the upper loading ring 67.

Tape guide blocks 90, 91 serve to pull out the magnetic tape 12 from the tape cassette 11 and wind the magnetic tape 12 on the periphery of the head drum 57 over a predetermined angle. The guide block 90 is connected to the lower loading ring 68, while the guide block 91 is connected to the upper loading ring 67.

The guide block 90 will be described first. The guide block 90 includes a block base plate 92 supporting a vertical guide post 93 on a distal end thereof (which is the left-hand end in the longitudinal direction of the block base plate 92 shown by the solid lines in FIG. 2) and a slanting guide post 94 of a proximal end thereof. The guide post 93 includes a roller 95, a pin 96 having a lower end embedded in a boss 97 on the distal end of the block base plate 92 and an externally threaded distal end, and ball bearings 98, 98 fitted over upper and lower portions of the pin 96. The roller 95 has an inner periphery fitted closely over the outer periphery of the ball bearings 98 so that the roller 95 is rotatably supported by the pin 96. A frusto-conical cap 99, the peripheral diameter of the lower edge of which is greater than that of the roller 95, is screwed tightly on the threaded end of the pin 96 just over the roller 95. The roller 95 has a lower end spaced apart from an upper surface of the block base plate 92 and having an annular ridge 100. The guide post 94 has a lower portion embedded in the proximal end of the block base plate 92 and an upper distal end extending to a position close to the distal end of the guide post 93. Guide pins 102, 102' have respective upper portions embedded in the block base plate 92 at positions close to the distal and proximal ends thereof. The guide pins 102, 102' have lower flanges 103, 103 and ride slidably in the guide slot 87 between the guide members 85, 85'. The flanges 103, 103 have upper surfaces held in slidable engagement with lower surfaces of the guide members 85, 85'.opposite to the guide surfaces 86, 86'.

The guide block 90 and the loading ring 68 are interconnected by a connector mechanism 104, located at the outside of the loading ring 68, which enables the guide block 90 to move vertically with respect to the loading ring 68 as the guide block 90 moves along the guide block guide members 85, 85'. The connector mechanism 104 will now be described. Lower end portions of the guide pins 102, 102' are inserted into holes made in an upper connecting plate 105 and then retaining rings 106 are attached to the ends of the guide pins 102, 102' for connecting the upper connecting plate 105 to the lower end portions of the guide pins 102, 102'. A connector 107 projects downwardly and vertically, after projecting slightly laterally, from one end of the upper connecting plate 105 at the side of the plate 105 not facing the head drum 57, and an end portion of the connector 107 is positioned at the outside of the lower loading ring 68. A lower connecting plate 108 is positioned along the under surface of the lower loading ring 68, and a connector 109 projects upwardly and vertically, after projecting slightly laterally, over the outer side periphery of the lower loading ring 68 from a front end of and a side of the lower connecting plate 108.

The lower connecting plate 108 has an oblong or elongate hole or slot 110 defined therein close to the distal end thereof and extending in the longitudinal direction of the connecting plate 108. An upstanding pin 111 projects from a proximal end of the lower connecting plate 108. The pin 111 has a larger diameter at an intermediate portion thereof and a groove 112 at its upper portion. The lower loading ring 68 has an oblong or elongate hole or slot 113 defined therein, the pin 111 having a lower portion slidably riding in the hole 113. An upstanding pin 114 projects from the lower loading ring 68 and has a groove 115 at its upper portion. The pin 114 also has a lower portion projecting downwardly from the under surface of the loading ring 68, which projecting lower portion extends through the elongate hole 110 defined in the lower connecting plate 108. A retaining ring 116 is attached to the end of the projecting lower portion of the pin 114, to prevent it coming out of the oblong hole 110.

A portion of the lower connecting plate 108 near the elongate hole 110 is thus sandwiched between the under surface of the lower loading ring 68 and the retaining ring 116. The lower portion of the pin 111 projecting from the proximal end of the lower connecting plate 108 engages in the elongate hole 113 in the lower loading ring 68. Therefore, the lower connecting plate 108 is held by the loading ring 68 and can be moved in a range defined by the longitudinal lengths of the elongate holes 110 and 113.

The upper and lower connecting plates 105, 108 are interconnected by a thin plate link 117, one end of which is pivotally coupled by a pin 118 to a lower portion of the connector 107 of the upper connecting plate 105 and the other end of which is pivotally coupled by a pin 119 to the connector 109 of the lower connecting plate 108.

One arc-like end of a first tension spring 120 is hooked up to the groove 115 of the pin 114 on the lower loading ring 68 and the other arc-like end of the spring is hooked up to the groove 112 of the pin 111 on the lower connecting plate 108. The lower connecting plate 108 is so biased due to the tension of the spring 120 as to press or urge the lower portion of the pin 111 against a distal end of the elongate hole 113 of the lower loading ring 68.

Therefore, the block base plate 92 of the guide block 90 is so supported by the guide members 85, 85' as to move along the guide surfaces 86, 86' thereof, and so connected to the lower loading ring 68 as to rotate due to rotation of the lower loading ring 68.

A tape guide 121 made of a self-lubricating synthetic resin, such as polyacetal, is attached to the distal end of the guide block 90. The tape guide 121 has a mounting portion 122 in the form of a thin plate and having a U-shaped notch 123. The tape guide 121 also includes a projection 124 projecting downwardly from a lower side edge of the mounting portion 122 at the side opposite to that where the notch 234 is formed, the projection 124 being tapered off toward its distal end. The tape guide 121 has a guide member 125 integral with the mounting portion 122, the guide member 125 slanting downwardly, from a portion connected to the mounting portion 122, to the distal end. The base plate 92 of the guide block 90 has a hole 126 defined in the distal end thereof and tapered off downwardly. The tape guide 121 is tightly attached to the distal end of the block base plate 92, the notch 123 being engaged with the boss 97 and the projection 124 being force-fitted into the hole 126.

The other tape guide block 91 will now be described. The tape guide block 91 includes a block base plate 127 and upstanding guide posts 128, 129 mounted vertically thereon, the post 128 being mounted on a distal end (which is the right-hand end of the block base plate 127 shown by the solid lines in FIG. 2) of the block base plate 127 and the post 129 being mounted on a proximal end of the block base plate 127. Since the guide post 128 is of substantially the same construction as the above-described guide post 93 mounted on the distal end of the guide block 90, the corresponding parts of the guide post 128 are denoted by corresponding reference numerals with prime suffixes and will not be described. However, the guide post 128 has a coil spring 101' interposed between a lower ball bearing 98' and a boss 97' for normally biasing a roller 59' upwardly. A vertical pin 130 has an intermediate portion embedded in the proximal end of the block base plate 127, the pin 130 having a portion projecting upwardly of the block base plate 127 and including an externally threaded distal end. A roller 131 of the guide post 129 has an axial hole rotatably fitted over the pin 130 and has recesses 132, 133 in upper and lower ends thereof, respectively. The roller 131 also has an annular ridge 134 at a lower end of the outer periphery thereof. The guide post 129 also includes a coil spring 135 disposed between the recess 133 in the lower end of the roller 131 and an upper surface of the block base plate 127, and a nut 136 threaded on the threaded distal end of the pin 130 in the recess 132 in the upper end of the roller 131. The roller 131 has its lower end resiliently supported by the coil spring 135 and its upper end retained by the nut 136 against dislodgement.

The upper loading ring 67 has an oblong or elongate hole or slot 137 through which extends a portion of the pin 130 projecting downwardly from the block base plate 127, the downwardly projecting portion of the pin 130 having a lower end projecting downwardly beyond the under surface of the loading ring 67 and having a groove 138. The portion of the pin 130 projecting downwardly from the block base plate 127 has a flange 139 having an under surface seated on the upper surface of the loading ring 67. A pin 140 has an upper end embedded in the block base plate 127 near the distal end thereof and a lower end passing through the elongate hole 137 in the loading ring 67. The pin 140 includes a downwardly projecting portion disposed below the block base plate 127 and having a flange 141, the lower surface of which is seated on the upper surface of the loading ring 67. A retaining ring 142 is fitted in a groove (not shown) defined in a lower end of the pin 140. Therefore, the pin 140 is retained on the loading ring 67 with the lower end held by the flange 141 and the retaining ring 142 to engage slidably in the elongate hole 137 in the loading ring 67. A second tension spring 143 has one end engaging in the groove 138 in the lower end of the pin 139 and its opposite end engaging a distal end of a pin 144 projecting downwardly from the loading ring 67 at a position slightly displaced from an end of the elongate hole 137. The guide block 91 is resiliently biased by the tension of the spring 143 to cause the pin 140 on the distal end of the block base plate 127 to contact the end of the elongate hole 137 in the loading ring 67. Thus, the tape guide block 91 is mounted on the upper loading ring 67 through the spring 143.

The lower connecting plate 108 and the lower end of the pin 114 of the connector mechanism 104, by which the tape guide block 90 is coupled to the lower loading ring 68, are disposed beneath the lower loading ring 68, which is positioned close to the upper surface of the chassis 16 (FIG. 6). As a consequence, there is a danger of the above parts of the connector mechanism 104 hitting the upper surface of the chassis 16. In the illustrated embodiment, to cope with this problem, the chassis 16 has a recess 145 (FIGS. 5 and 7) coextensive with the path of movement of the connector mechanism 104 along and below the lower loading ring 68. The recess 145 serves to prevent the parts of the connector mechanism 104 from hitting the upper surface of the chassis 16. It would instead be possible to position the loading rings 67, 68 in spaced relation from the upper surface of the chassis 16 in order to prevent the components of the connector mechanism 104 from contacting the chassis 16. Such an arrangement would however require that other parts than the loading rings 67, 68, in particular the upper end of the drum 57, be placed in a higher position, with the result that the overall thickness of the VTR deck 4 would be increased. With the recess 145 defined in the chassis 16 as illustrated, the VTR deck 4 can be of a lower profile.

When the loading rings 67, 68 are rotated by the drive unit 75 from the solid-line position (hereinafter referred to as the "initial position") shown in FIG. 2, parts of the device will be moved to positions indicated by the two-dot-and-dash lines. More specifically, as mentioned above, the upper loading ring 67 is turned counterclockwise and the lower loading ring 68 is turned clockwise.

When the upper loading ring 67 is turned counterclockwise, the pin 144 projecting from the lower surface of the upper loading ring 67 pulls the pin 130 of the guide block 91 via the tension spring 143 to move the guide block 91 with the upper loading ring 67 around the right-hand side of the head drum 57 to a position in front of the head drum 57. As the guide block 91 reaches the position in front of the head drum 57, the downwardly projecting portions of the pins 130, 140 below the block base plate 127 engage in the guide groove 50 in the right-hand guide end 46 of the drum base 42. The guide block 91 is stopped in a position (hereinafter referred to as the "stop position") in which the pin 140 abuts against the bottom or closed end of the guide groove 50. The upper loading ring 67 will be turned slightly further and then stopped after the guide block 91 is stopped in the stop position in the guide end 46. Therefore, the pin 140 of the guide block 91 is resiliently held against the bottom end of the guide groove 50 in the guide end 46 under the tension of the spring 143.

The lower loading ring 68 is turned clockwise in synchronism with the turning movement of the upper loading ring 67. The pin 114 projecting from the lower loading ring 68 pulls the pin 111 on the lower connecting plate 108 via the tension spring 120, and the lower connecting plate 108 pulls the upper connecting plate 105 through the plate link 117. Thus, the guide block 90 is moved on and along the guide surfaces 86, 86' of the guide members 85, 85' while the guide pins 102, 102' projecting downwardly from the base plate 92 are being guided by the guide slot 87 defined between the guide members 85, 85'. The guide block 90, as it moves on and along the guide surfaces 86, 86', is turned around the left-hand side of the head drum 57 toward a position in front of the head drum 57. As the guide block 90 approaches the position in front of the head drum 57, the guide block 90 follows an upper portion of the outer peripheral surface of the head drum 57 (FIG. 10). More specifically, when the guide block 90 is in the initial position, it faces a substantially vertical central portion of the outer peripheral surface of the head drum 57. As the lower surface of the block base plate 92 is then supported on the inclined portions of the guide surfaces 86, 86' of the guide members 85, 85', the guide block 90 is raised along the inclined portions of the guide surfaces 86, 86' to follow the upper portion of the outer peripheral surface of the head drum 57. When the guide block 90 has reached the position in front of the head drum 57, the guide pins 102, 102' are moved out of the guide slot 87 between the guide members 85, 85' into the guide groove 51 in the guide end 47. The guide block 90 is stopped in a position (hereinafter referred to as the "stop position") in which the leading guide pin 102 abuts against the bottom or closed end of the guide groove 51. The lower loading ring 68 will be turned slightly further after the guide block 90 is stopped in the stop position in the guide end 47. After the loading ring 68 has stopped rotating, the tension spring 120 is elongated with respect to its initial length so that the guide block 90 will be held stably in the stop position with the pin 102 pressed against the bottom or closed end of the guide groove 51 in the guide end 47. The guide posts 93, 94 and 128, 129 on the tape guide blocks 90, 91, when disposed in their respective stop positions, are positionally related to the outer peripheral surface of the head drum 57 as will now be described.

The positional relationship in the circumferential direction of the head drum 57 (see, for example, FIGS. 2, 4, 12 and 13) will be described first. The leading guide post 93 of the guide block 90 is displaced from the front central portion of the outer peripheral surface of the head drum 57 slightly to the left, while the trailing guide post 94 is spaced leftwardly from the guide post 93. The leading guide post 128 of the guide block 91 is displaced from the front central portion of the outer peripheral surface of the head drum 57 slightly to the right, while the trailing guide post 129 is spaced rightwardly from the guide post 128.

The positional relationship in the vertical direction of the head drum 57 (see, for example, FIGS. 4 and 13) will now be described. The guide posts 93, 94 of the guide block 90 are disposed substantially in confronting relation to the upper portion of the outer peripheral surface of the head drum 57, that is, the outer peripheral surface of the upper drum 63, with the lower ends of the guide posts 93, 94 facing the lower drum 58. The guide posts 128, 129 of the guide block 91 are disposed substantially in confronting relation to a lower portion of the outer peripheral surface of the lower drum 58, with the upper ends of the guide posts 128, 129 facing the upper drum 63. Therefore, the position in which the guide posts 93, 94 of the guide block 90 confront the outer peripheral surface of the head drum 57 is displaced vertically from the position in which the guide posts 128, 129 of the guide block 91 confront the outer peripheral surface of the head drum 57.

The tape guide blocks 90, 91 are returned from the stop positions to their respective initial positions when the loading rings 67, 68 are rotated in directions opposite to those in which they are rotated to bring the tape guide blocks 90, 91 to their stop positions. More specifically, when the upper loading ring 67 is turned clockwise, the guide block 91 travels around the right hand side of the outer periphery of the head drum 57 to be moved from the stop position on the guide end 46 to the lower side of the head drum 57, namely to the position of the guide block 91 illustrated by solid lines in FIG. 2.

As the lower loading ring 68 is turned counterclockwise, synchronously with the clockwise rotation of the upper loading ring 67, the guide block 90 is pushed by the lower loading ring 68 through the connector mechanism 104 simultaneously with its guide pins 102, 102' being guided by the guide groove 51 in the guide end 47 and the guide groove 87 formed by the guide block guide members 85, 85', and the guide block 90 thus is moved from the stop position on the guide end 47 to the lower side of the head drum 57, namely to the position of the guide block 90 illustrated by solid lines in FIG. 2. The guide blocks 90, 91 then nearly abut one another and stop there.

A guide block 146 fixed on the chassis 16 is arranged on the outside of the outer guide block guide member 85 at a position nearly due left of the head drum 57. An attachment base 147 of the guide block 146 is fixed on the chassis 16 and has two guide posts 148, 149 thereon. The guide post 148 has a pin 150, the lower portion of which is embedded in the base 147 and the upper portion of which protrudes upwardly and has a screw thread at its end. A roller 151 is rotatably mounted on the pin 150 and a guide member 152 is so mounted on the pin 150 that a base portion thereof contacts the under surface of the roller 151. The guide member 152 has a distal end projecting rightwardly of the pin 150. The guide member 152 is progressively wider toward its distal end and slightly bent downwardly, the distal end of the guide member 152 being located in the vicinity of an outer side edge of the guide member 85. The distal end of the guide member 152 has a recess 153 opening to the right. A coil spring 154 is interposed under compression between a lower surface of the guide member 152 and an upper surface of the attachment base 147. A ring 155 is disposed on an upper end of the roller 151 and has a diameter larger than that of the roller 151. A nut 156 is threaded over the threaded upper end of the pin 150. The roller 151 is rotatably supported on the pin 150 between the guide member 152 and the ring 155. The guide post 149 projects upwardly from the attachment base 147 and is inclined to the right. More specifically, the guide post 149 has a lower portion embedded in a right-hand portion of the attachment base 147, an intermediate portion passing through the recess 153 in the guide member 152, and an upper end positioned above the guide surface 86 of the guide member 85. The distal edge of the guide member 152, and the portion of the guide surface 86 of the guide member 85 to which the distal edge of the guide member 152 is located in close proximity, lie substantially flush with each other.

The device further comprises a guide post 157, a full-width erase head 158 and a tension regulator 159. The tension regulator 159 serves to control the tension of the magnetic tape 12 as it is pulled out of the tape cassette 11 for allowing the magnetic tape 12 to run under appropriate tension. The tension regulator 159 is moved from the position of FIG. 2 to the position of FIG. 12 as the magnetic tape 12 is pulled out of the tape cassette 11. The device is also provided with an audio head 160, a guide post 161 fixed to the chassis 16, a capstan 162, and a pinch roller 163 attached to a pinch roller arm (not shown). In a recording mode, the pinch roller 163 is moved from the position of FIG. 2 to the position of FIG. 12 in which the pinch roller 163 is pressed against the capstan 162 with the magnetic tape 12 sandwiched therebetween to cause the magnetic tape 12 to travel at a constant speed by being pinched between the pinch roller 163 and the capstan 162.

A first transmission gear 164 for loading the magnetic tape is rotatably supported on a shaft (not shown) projecting from the chassis 16. The first transmission gear 164 comprises a smaller-diameter gear 166 having gear teeth 165 held in mesh with the gear teeth 74 on the outer peripheral edge of the lower loading ring 63, and a larger-diameter gear 167 which is integral with and disposed below the smaller-diameter gear 166 and has gear teeth 168 on an outer peripheral edge thereof. A swing arm 169 has a proximal end pivotally supported on the upper end of the shaft (not shown) of the first transmission gear 164 and having a lower surface held in slidable contact with an upper surface of the smaller-diameter gear 166. The swing arm 169 has a distal end extending radially outwardly of the outer peripheral edge of the larger-diameter gear 167. A swing gear 170 is rotatably supported on the distal end of the swing arm 169 and has, on an outer peripheral edge thereof, gear teeth 171 which are held in mesh with the gear teeth 168 of the larger-diameter gear 167.

A second transmission gear 172 for loading the magnetic tape is rotatably supported on a shaft 173 projecting from the chassis 16 at a position close to the first transmission gear 164. The second transmission gear 172 has an integral belt pulley 174 below it. The second transmission gear 172, which has gear teeth 175 on its periphery, is rotated by the first transmission gear 164 through the swing gear 170. More specifically, the swing gear 170 of the first transmission gear 164 is positionally displaced on counterclockwise rotation of the lower loading ring 68 to bring the gear teeth 171 into mesh with the gear teeth 175 of the second transmission gear 172. When the lower loading ring 68 is first turned clockwise, the smaller-diameter gear 166 and the larger-diameter gear 167 of the first transmission gear 164 are rotated counterclockwise, and the swing arm 169 is turned such that the distal end thereof is angularly displaced counterclockwise due to frictional forces produced between the lower surface of the proximal end of the swing arm 169 and the smaller-diameter gear 166 as the latter rotates anticlockwise. At this time, the swing arm 169 and the swing gear 170 are held by a stop (not shown) in the solid-line position of FIGS. 2 and 12, and the swing gear 170 is thus spaced from the second transmission gear 172. When the lower loading ring 68 is then turned counterclockwise, the smaller-diameter gear 166 and the larger-diameter gear 167 of the first transmission gear 164 are rotated clockwise, so that the distal end of the swing arm 169 is angularly displaced clockwise to put the gear teeth 171 of the swing gear 170 into mesh with the gear teeth 175 of the second transmission gear 172. Since the swing gear 170 is also in mesh with the larger-diameter gear 167 of the first transmission gear 164, clockwise rotation of the first transmission gear 164 causes the swing gear 170 to rotate counterclockwise to thereby rotate clockwise the second transmission gear 172 with which the swing gear 170 meshes. Consequently, the second transmission gear 172 is rotated clockwise only when the lower loading ring 68 is turned anticlockwise, that is, in the direction to move the tape guide block 90 from the stop position back to the initial position.

A belt pulley 176 is attached to a lower portion of the reel base 17 having the drive shaft 19 for rotating the takeup reel 14 of the tape cassette 11. A belt 177 is entrained around the belt pulley 176 and the belt pulley 174 on the second transmission gear 172. Upon clockwise rotation of the second transmission gear 172, the pulley 176 is rotated clockwise by the belt 177 to thereby rotate the drive shaft 19 clockwise, whereupon the tape reel 14 is rotated clockwise to wind up the magnetic tape.

Guide posts 178, 179 are disposed on opposite sides of a tape access recess 180 in the tape cassette 11 and close to the front face thereof.

When the tape guide blocks 90, 91 are in their respective initial positions, the guide posts 93, 94 and 128, 129 are positioned at the same height as the tape access recess 180 from the chassis 16.

The tape loading operation of the tape loading mechanism as described above, and the manner in which the magnetic tape is guided to run by the tape guide members, will now be described.

When the tape cassette 11 is put into the cassette holder 20 of the VTR deck 4, the magnetic tape 12 extends from the tape reel 13 to the tape reel 14 in the tape cassette 12 along a tape path indicated by the two-dot-and-dash line in FIG. 2. In this condition, the tape guide blocks 90, 91 are positioned in the tape access recess 180 in the tape cassette 11.

In response to rotation of the loading rings 67, 68, caused by the drive unit 75, in their respective loading directions, that is anticlockwise for the upper loading ring 67 and clockwise for the lower loading ring 68, the guide block 90 is moved so as to slide on and along the guide surfaces 86, 86' of the guide members 85, 85' to the stop position in the guide end 47. At the same time, the guide block 91 is moved to the stop position in the guide end 46. Due to such movement of the guide blocks 90, 91, the magnetic tape 12 is pulled out of the tape cassette 11 by the leading guide posts 93, 128 of the guide blocks 90, 91 until finally the magnetic tape 12 extends along a tape path illustrated in FIG. 12.

Figure 12:
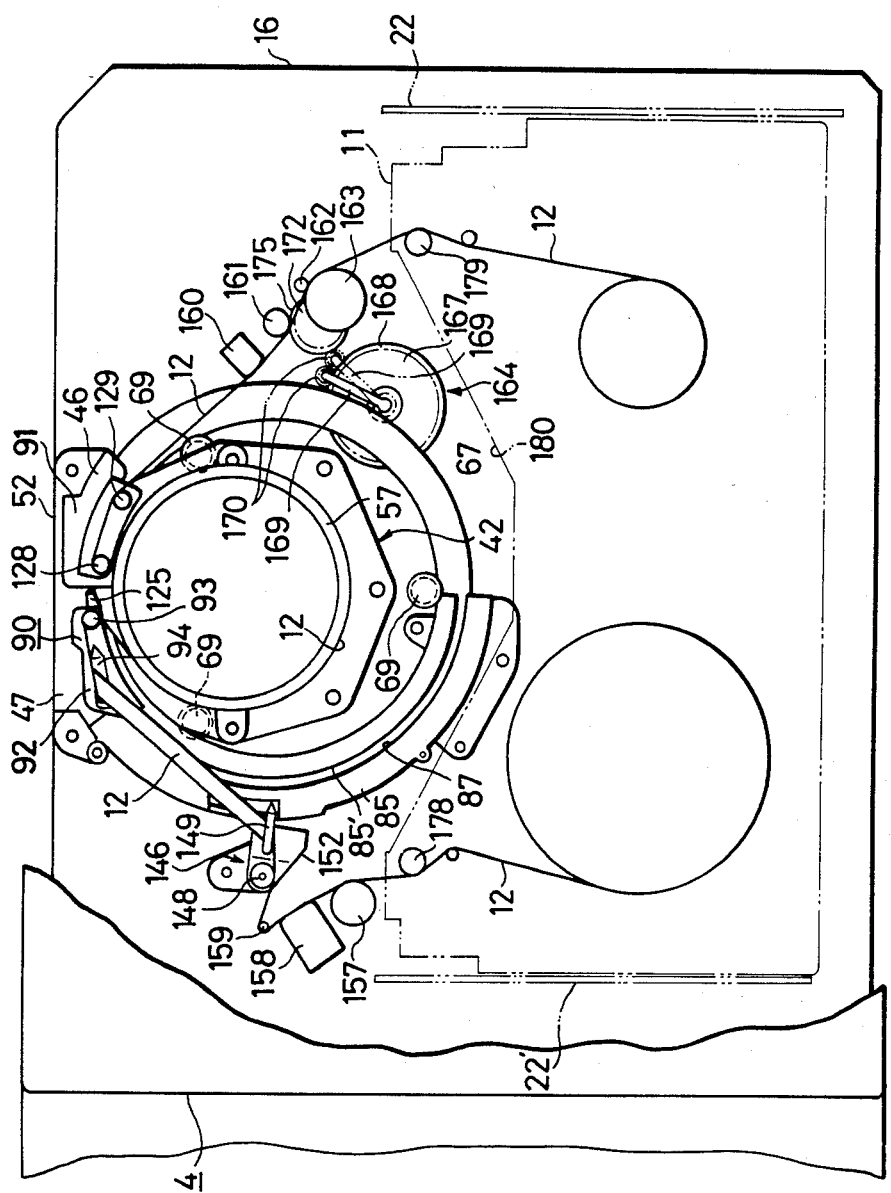
FIG. 12 is a fragmentary plan view of the VTR deck with the magnetic tape wound around the outer peripheral surface of a head drum over a predetermined angle.
Figure 13:
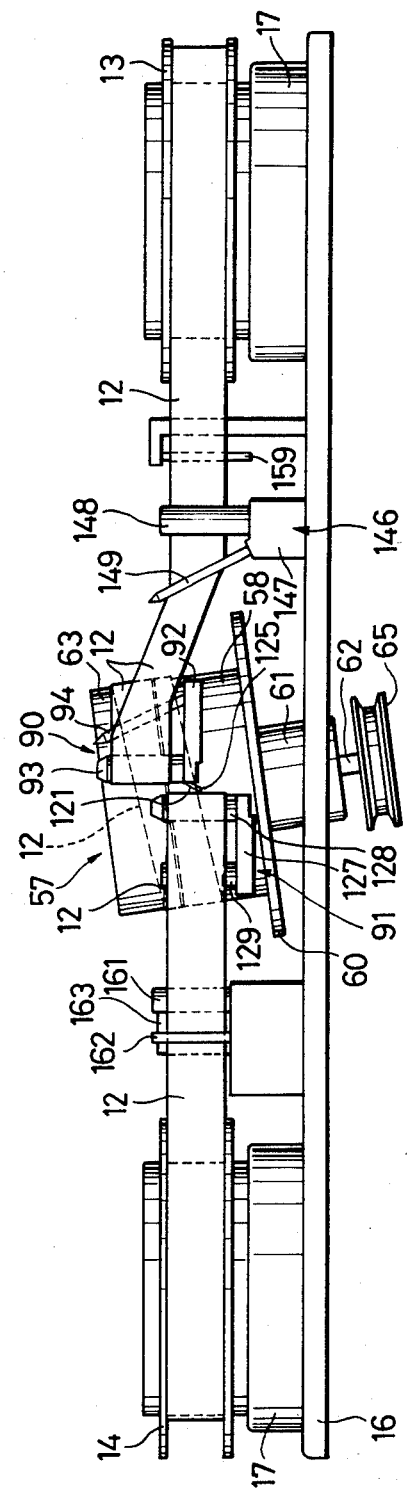
FIG. 13 is a side elevational view illustrative of a tape path of the magnetic tape.

Because the guide block 91 only moves in unison with the upper loading ring 67, the guide posts 128, 129 of the guide block 91 do not change their vertical positions while they are being moved from the initial position to the stop position. The height of the guide posts 128, 129 in the stop position is the same as their height in the initial position, that is the height of the magnetic tape 12 in the tape cassette 11. Accordingly, the portion of the magnetic tape 12 wound around the guide post 128 when the guide block 91 is held in the stop position (FIG. 12) is at the same height as that of the portion of the tape cassette 11 from which the magnetic tape 12 is pulled out (FIG. 13). With the guide block 91 held in the stop position, the point of contact with the outer peripheral surface of the head drum 57 of a straight line contacting the outer peripheral surface of the guide post 128 (that is, the roller 95') and the right-hand half of the outer peripheral surface of the head drum 57 is indicative of an end position of the magnetic tape 12 as unreeled from the takeup reel 14 and wound around the outer peripheral surface of the head drum 57.

When the tape loading operation is started, the guide block 90 is moved forwardly around the head drum 57 and at the same time is progressively or gradually raised by the guide members 85, 85'. The guide posts 93, 94 of the guide block 90 are also displaced upwardly while they are being moved from the initial position to the stop position. The length of the magnetic tape 12 as it is pulled out by the guide post 93 is also pulled upwardly. Such upward movement of the magnetic tape 12 is smoothly carried out by the tape guide 121 attached to the guide block 90. More specifically, as shown in FIG. 10, when the guide block 90 is in the initial position the guide post 93 is at the same height as that of the tape cassette portion from which the magnetic tape 12 is pulled out. The height of the guide post 93 remains unchanged until the guide block 93 moves past the flat portions preceding the slanting portions of the guide surfaces 86, 86' of the guide members 85, 85'. Therefore, the portion of the magnetic tape 12 wound around the guide post 93 is held in flatwise contact with the outer peripheral surface of the roller 95 of the guide post 93, with the upper and lower edges of the magnetic tape 12 being disposed between the lower flanged bottom of the cap 99 and the lower annular ridge 100 of the roller 95. As the guide block 90 is moved along the slanting portions of the guide surfaces 86, 86' of the guide members 85, 85', the guide post 93 becomes tilted in a direction opposite to that of the movement thereof while it is displaced upwardly. The magnetic tape 12 is now subjected to forces tending to displace the portion thereof around the guide post 93 downwardly off the outer peripheral surface of the roller 95. However, the lower edge of the magnetic tape portion wound around the guide post 93 is brought into contact with the upper surface of the guide member 125 of the tape guide 121. This causes the wound tape portion to be pushed up in the direction of an arrow 181 (FIG. 10) as the guide member 125 is displaced upwardly with the guide block 90 until the wound tape portion is placed in position on the guide post 93.

The portion of the magnetic tape 12 wound around the guide post 93 is therefore displaced upwardly as the magnetic tape 12 is pulled out by the guide post 93. At the same time, the tape tension regulator 159 is moved from the position of FIG. 2 to the position of FIG. 12 to guide the length of the magnetic tape 12 unreeled from the supply tape reel 13 into a tape path in which the magnetic tape 12 is in contact with the guide post 178 in the tape cassette 11, the first guide post 157 and the full-width erase head 158, wound around the tape tension regulator 159 in a position leftward of the fixed guide block 146, and then folded back toward the head drum 57. When the guide block 90 has moved past the fixed guide block 146, the magnetic tape 12 as folded back from the tape tension regulator 159 is brought into contact with the guide posts 148, 149 of the fixed guide block 146, extends from the guide post 149 past the slanting guide post 94 of the guide block 90, and is then wound around the guide post 93 thereof. When the guide block 90 is stopped in the stop position, the length of the magnetic tape 12 between the guide posts 93 and 128 extends in an arc of about 310° obliquely to and around the outer peripheral surface of the head drum 57. At this time, the point of contact with the outer peripheral surface of the head drum 57, of a straight line contacting the outer peripheral surface of the guide post 93 (that is, the roller 95) and the left-hand half of the outer peripheral surface of the head drum 57, is indicative of a start position of the magnetic tape 12 as unreeled from the supply reel 13 and wound around the outer peripheral surface of the head drum 57. The tape path of the magnetic tape 12 as pulled out of the tape cassette 11 by the guide posts 93, 94 of the guide block 90 and the guide posts 128, 129 of the guide block 91 is as illustrated in FIG. 12, and the magnetic tape 12 will run along the illustrated tape path in operation.

Since the start and end positions of the magnetic tape 12 as wound around the outer peripheral surface of the head drum 57 are vertically displaced from each other, the tape path (as observed vertically) of the magnetic tape 12 as pulled out of the tape cassette 11 is as illustrated in FIG. 13. More specifically, the magnetic tape 12 as unreeled from the supply reel 13 and pulled out of the tape cassette 11 extends horizontally and hence has the same vertical position as that of the tape cassette portion from which the magnetic tape 12 is pulled out until the magnetic tape 149 is wound around the first guide post 157, that is, in the tape path from the tape reel 13 to the guide post 178, the guide post 159, the full-width erase head 158, the tape tension regulator 159, the vertical guide post 148 of the fixed guide block 146 and the slanting guide post 149. Then, the magnetic tape 12 is obliquely elevated during the interval or spacing between the slanting guide post 149 and the slanting guide post 94 of the guide block 90, from which the magnetic tape 12 extends horizontally again. The magnetic tape 12 is thereafter folded back from the vertical guide post 93 of the guide block 90, and then wound obliquely around the outer peripheral surface of the head drum 57 between the start and end positions of the portion of the magnetic tape 12 wound around the outer peripheral surface of the head drum 57. The magnetic tape 12 leaves the outer perpheral surface of the head drum 57 at the end position of the tape and extends substantially horizontally at the same height as that of the tape cassette portion from which the magnetic tape 12 is pulled out. The magnetic tape 12, as it extends out of contact with the outer peripheral surface of the head drum 57, runs from the guide posts 128, 129 of the guide block 91 to the audio head 160, the fixed guide post 161, the capstan 162 and the pinch roller 163, the guide post 179 in the tape cassette 11 and finally to the takeup tape reel 14. In such tape path, the magnetic tape 12 is positioned at the same height as that of the tape cassette portion from which the magnetic tape 12 is pulled out. The magnetic tape 12 as pulled out of the tape cassette 11 is vertically displaced between the tape withdrawal position in the tape cassette 11 and the tape winding start position on the head drum 57 by the two slanting guide posts 94, 149 disposed in the tape path extending between the tape withdrawal position and the tape winding start position.

The magnetic tape 12, as it runs through the above tape path, is fed along at a constant speed while being pinched between the capstan 162 and the pinch roller 163, during which time video signals are magnetically recorded or reproduced along tracks of a prescribed length formed or scanned on the magnetic tape 12 by the video heads 64, 64' on the head drum 57.

When an eject button (not shown) is depressed after a desired recording or playback mode has been finished, the loading rings 67, 68 are rotated in respective unloading directions, that is the upper loading ring 67 is rotated clockwise and the lower loading ring 68 is rotated counterclockwise. The tape guide blocks 90, 91 are then returned to the initial positions (indicated by the solid lines in FIG. 2). The rotation of the lower loading ring 68 causes the first transmission gear 164 to rotate and thus causes the second transmission gear 172 to rotate through the swing gear 170. The drive shaft 19 of the takeup tape reel 14 of the tape cassette 11 is rotated clockwise through the pulley 174 of the second transmission gear 172, the belt 177, and the pulley 176, thus rotating the takeup tape reel 14 in a direction to wind up the magnetic tape 12. The magnetic tape 12 which has been pulled out in the tape path as shown in FIG. 12 is then pulled back into the tape cassette 11 by the takeup tape reel 14.

The device embodying the present invention and described above offers the following advantages:

(1) The device is small in size, light in weight, capable of winding the magnetic tape on the periphery of the head drum with good accuracy and capable of maintaining stable travel of the magnetic tape.

(2) No large shocks are imparted to the device and no impulsive loads are imposed on the motor during loading of the magnetic tape on the head drum, and the magnetic tape can run accurately on the periphery of the head drum.

(3) The magnetic tape can be helically and smoothly wound on the periphery of the head drum without causing any unfavorable torsion, folding, etc., despite shortening of the distance or extent by which the tape is pulled out from the tape cassette.

(4) The magnetic tape can also smoothly travel without causing any torsion, folding, slackening, etc. in the path from the lower position where the magnetic tape is pulled out from the tape cassette to the higher position where the magnetic tape begins to be wound on the head drum, and the system to realize this is of simple construction and easily adjustable.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

I claim:

1. A magnetic tape loading device comprising a head drum having magnetic heads, a drum base supporting said head drum, a chassis, two loading rings supported on an upper surface of said chassis and rotatable in opposite directions, two tape guide blocks having guide posts for pulling out a magnetic tape from a tape cassette and winding it on said head drum, and guide block guide members for guiding one of said two tape guide blocks, said two loading rings being vertically spaced in coaxial relation at the outside of said drum base, said one of said two tape guide blocks being supported on said guide block guide members to be movable along a path slanted with respect to said two loading rings and being coupled to the lower loading ring by a connector mechanism, and the other of said tape guide blocks being coupled to the upper loading ring, so that said two tape guide blocks are movable in opposite directions around a periphery of said head drum in response to rotation of said two loading rings for winding said magnetic tape helically on said periphery of said head drum over an angle of contact with said head drum of at least 300° and with a spacing between the beginning and end of a portion of said magnetic tape that contacts said head drum corresponding substantially to the width of said magnetic tape.

2. A magnetic tape loading device according to claim 1, comprising a first spring by which a torque from said lower loading ring is transmitted to said one of said tape guide blocks, so that when said one of said tape guide blocks is stopped in a position where an operation of loading said magnetic tape on said head drum is finished, said lower loading ring is stopped against the force of said first spring.

3. A magnetic tape loading device according to claim 1, comprising a second spring by which a torque from said upper loading ring is transmitted to the other of said tape guide blocks, so that when said other of said tape guide blocks is stopped in a position where an operation of loading said magnetic tape on said head drum is finished, said upper loading ring is stopped against the force of said second spring.

4. A magnetic tape loading device according to claim 1, wherein said one of said two tape guide blocks movable along said guide block guide members has a tape guide on a front end thereof for gradually moving said magnetic tape a distance corresponding substantially to the width of said magnetic tape during the operation of loading said magnetic tape on said head drum.

5. A magnetic tape loading device according to claim 1, wherein a plurality of guide posts are arranged in a path of travel of said magnetic tape from a position where said tape has been pulled out from said tape cassette to the position of said beginning of said portion of said tape that contacts said head drum, said two positions being of different height from one another, only two of said plurality of guide posts are slanted, one of said two slanted guide posts being mounted on said one of said two tape guide blocks and the other of said two slanted guide blocks being fixed to said chassis, and said magnetic tape is supported only by said two slanted posts over an extent thereof over which said difference in height as between said two positions takes place.

* * * * *